United States Patent [19]
Creter

[11] Patent Number: 5,924,820
[45] Date of Patent: Jul. 20, 1999

[54] ANTI-SCOUR DEVICE AND METHOD FOR SCOUR PREVENTION

[76] Inventor: Richard E. Creter, 24 Timberwick Dr., Flemington, N.J. 08822

[21] Appl. No.: 08/807,110

[22] Filed: Feb. 26, 1997

[51] Int. Cl.⁶ ........................................................ E02B 3/06
[52] U.S. Cl. ............................................. 405/25; 405/32
[58] Field of Search .................................. 405/15, 16, 17, 405/18, 19, 20, 21, 23, 25, 31, 32

[56] References Cited

U.S. PATENT DOCUMENTS

| | | |
|---|---|---|
| 331,127 | 11/1885 | Goodridge, Jr. ........................... 405/21 |
| 805,142 | 11/1905 | Kellner . |
| 1,816,095 | 7/1931 | Stanford . |
| 1,847,043 | 2/1932 | Ball . |
| 2,069,715 | 2/1937 | Arpin . |
| 2,341,515 | 2/1944 | Rehfeld . |
| 2,348,508 | 5/1944 | Wells ........................................ 405/21 |
| 2,662,378 | 12/1953 | Schmitt et al. . |
| 2,967,398 | 1/1961 | Smith . |
| 3,561,219 | 2/1971 | Nishizawa et al. ........................ 405/19 |
| 4,168,335 | 9/1979 | Vos et al. .................................. 405/16 |
| 4,436,447 | 3/1984 | Crowe . |
| 4,439,059 | 3/1984 | Kikuzawa et al. . |
| 4,477,206 | 10/1984 | Papetti et al. ............................. 405/19 |
| 4,498,805 | 2/1985 | Weir . |
| 4,502,816 | 3/1985 | Creter . |
| 4,710,056 | 12/1987 | Parker . |
| 4,726,708 | 2/1988 | Papetti ..................................... 405/32 |
| 4,818,141 | 4/1989 | Rauch . |
| 4,913,595 | 4/1990 | Creter, Jr. et al. . |
| 4,954,013 | 9/1990 | Lamberton ............................... 405/32 |
| 5,011,328 | 4/1991 | Atkinson et al. . |
| 5,120,156 | 6/1992 | Rauch . |
| 5,257,878 | 11/1993 | Peterson . |
| 5,269,254 | 12/1993 | Gagliano ................................. 405/32 |
| 5,348,419 | 9/1994 | Bailey et al. . |
| 5,358,356 | 10/1994 | Romanek et al. . |

FOREIGN PATENT DOCUMENTS

| | | |
|---|---|---|
| 0 178 510 | 9/1985 | European Pat. Off. . |
| 1019527 | 1/1953 | France . |
| 63618 | 9/1955 | France ..................................... 405/32 |
| 2 367 146 | 10/1976 | France . |
| 2 446 893 | 1/1979 | France . |
| 2 598 162 | 4/1986 | France . |
| 877057 | 9/1961 | United Kingdom . |

Primary Examiner—Tamara Graysay
Assistant Examiner—Frederick L. Lagman
Attorney, Agent, or Firm—Kenyon & Kenyon

[57] ABSTRACT

A device and method for preventing the scouring of sand from the area adjacent to the beachward (shoreward) side of a breakwater. The device is made from flexible, non-corrosive, marine resistant material having a cavity filled with a non-buoyant material. The device is placed on the seabed adjacent to the beachward (shoreward) side of the breakwater and is coupled to the beachward (shoreward) bottom edge of the breakwater. Filter material may be placed between the device and the seabed to further prevent scouring of sand between the non-buoyant material.

24 Claims, 3 Drawing Sheets

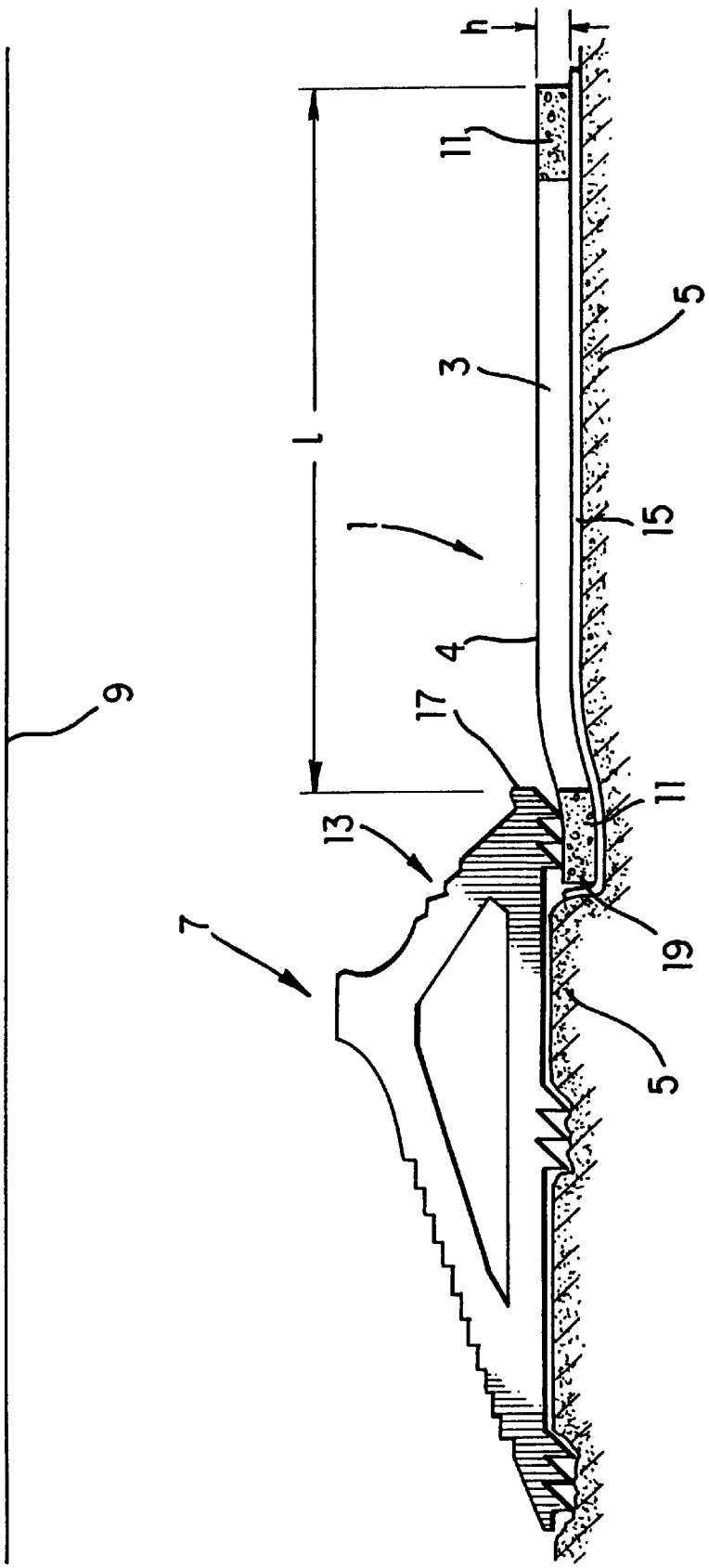

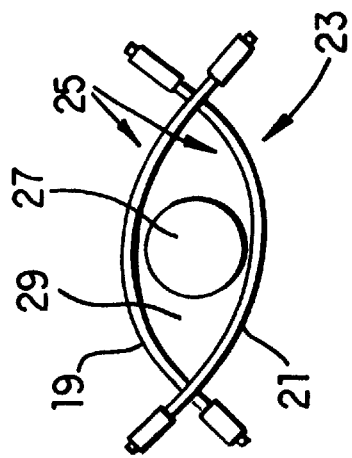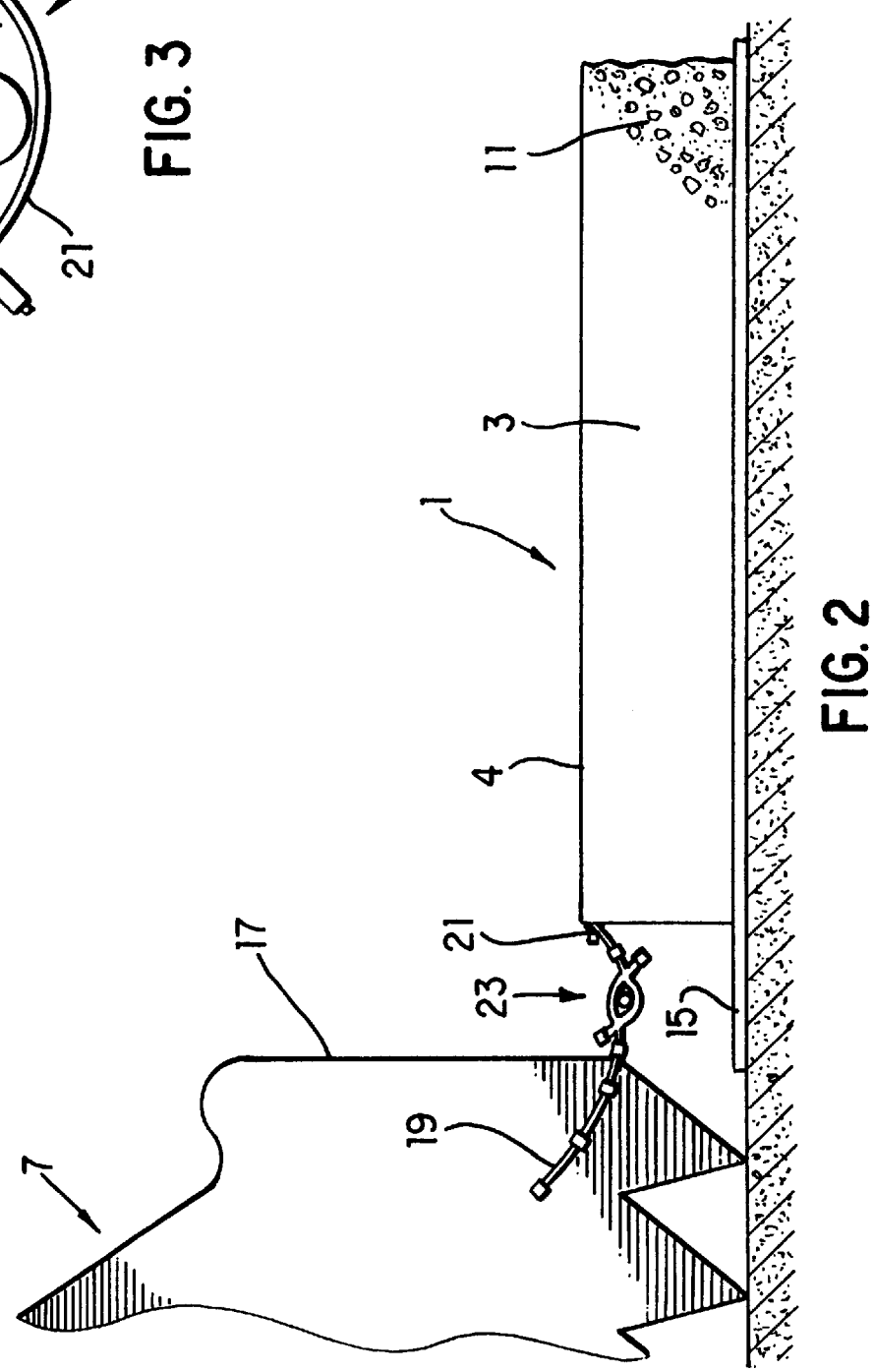

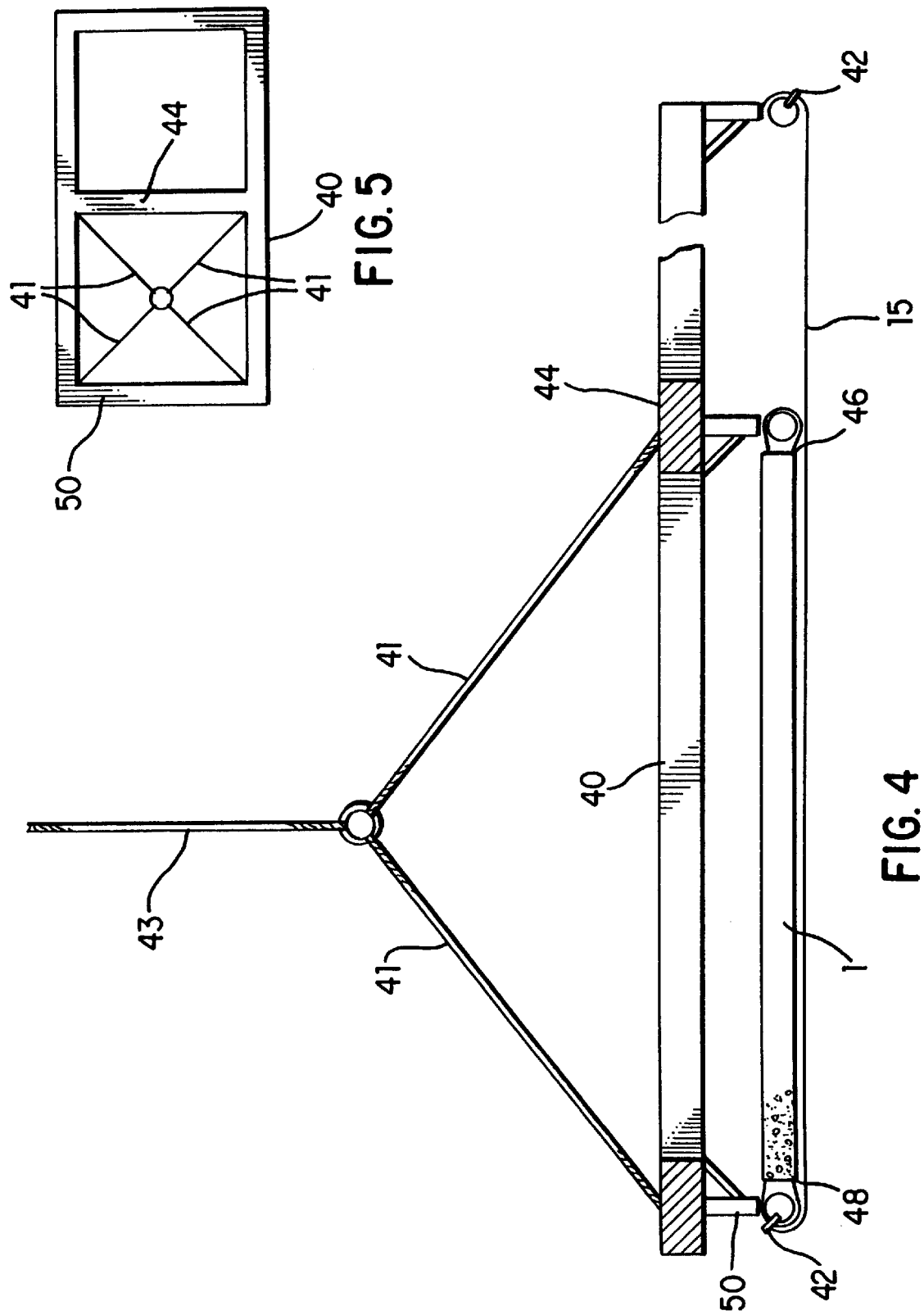

ANTI-SCOUR DEVICE AND METHOD FOR SCOUR PREVENTION

FIELD OF THE INVENTION

The present invention relates to an anti-scour device and method for scour prevention. More particularly, the present invention relates to a device and method for preventing scour of the sea bed adjacent to the beachward (shoreward) face of a breakwater.

BACKGROUND INFORMATION

Modular breakwaters have been placed on sea bottoms in the vicinity of eroding shorelines to protect the shorelines from further erosion. However, it has been found that when such breakwaters are employed in areas where they are fully submerged, i.e., where the barrier or reef is placed in about seven to eight feet of water, concerns arise in assembling the breakwater and with toe scour adjacent the beachward (shoreward) face. As the slope of the sea bottom is increased, the tendency for shoreline erosion increases.

The problem of stabilizing the sea bottom adjacent the beachward (shoreward) face is exacerbated in man-made beaches, i.e., where sand has been pumped in to build-up the beach. These replenished beaches have relatively steep slopes in the area where they meet the natural sea bottom and have a very high tendency toward erosion. In these instances, scouring of the sea bottom adjacent the beachward (shoreward) toe of a submerged reef tends to diminish the erosion protection advantages of the reef and eventually reduces the stability of the artificial reef structure.

The prior art discloses modular breakwaters for minimizing or eliminating the scouring of sand adjacent to the beachward (shoreward) toe of the breakwater when the breakwater is submerged, in U.S. Pat. No. 5,238,326 and U.S. Pat. No. 5,102,257, the disclosures of which are incorporated herein by reference. U.S. Pat. No. 5,102,257 discloses that each module includes a base portion for supporting the module on a seabed, a gently sloping seaward face extending above the base portion, and a beachward (shoreward) face extending above the base portion. The beachward (shoreward) face includes a deflector for deflecting downwardly directed fluid currents away from the beachward (shoreward) face.

The seaward face also includes a recessed portion that forms a transversely extending concave surface adjacent to the top edge for directing fluid currents over the top edge and away from the beachward (shoreward) face. Accordingly, the concave surface in the seaward face also prevents currents from reaching the seabed adjacent to the beachward (shoreward) toe of the breakwater. This concave surface further reduces the velocity of the wave passing over the breakwater, thereby minimizing the velocity of currents that may reach the seabed adjacent to the beachward (shoreward) toe of the breakwater to greatly reduce the degree of beachward (shoreward) toe scour.

U.S. Pat. No. 5,238,326 discloses a system that works well to reduce wave energy and limit the offshore loss of sand during storms through the functioning of a "backwash flume" on the beachward (shoreward) side of the reef. During storms, a strong offshore or cross-current is present which would normally carry large amounts of sand offshore if the reef was not there. These currents are redirected upward or vertically when they encounter the beachward (shoreward) side of the reef and the "backwash flume." This vertical and sand laden current is redirected toward the beach when it encounters the next oncoming wave, thus the previously eroded beach sand is returned to the beach.

A problem may occur, particularly during storms, which has previously gone unanswered. Because the structures of various breakwaters, including ones with a "backwash flume," create a high velocity upward current from an otherwise offshore current, a vortex is sometimes formed on the beachward (shoreward) side of the reef during a storm. This vortex can scour sand away from the base of the reef along the beachward (shoreward) edge. It has been determined that, in general, the effect of this vortex only extends beachward (shoreward) of the reef a distance that is equal to the depth of the reef submergence with respect to a storm-elevated mean sea level. It has also been determined that the greatest amount of scour occurs at about one half this distance beachward (shoreward) of the reef.

Therefore, there is a need to provide a method and device for minimizing or eliminating scouring of sand adjacent to a modular breakwater's beachward (shoreward) toe due to beachward (shoreward) side vortexes when the breakwater is submerged.

SUMMARY OF THE INVENTION

The present invention is directed to a method and device for minimizing or eliminating the problems and disadvantages of modular breakwaters according to the prior art. The present invention accomplishes this goal by providing a method for implementing an anti-scouring device to minimize or eliminate the scouring effects of storms and vortexes on the beachward (shoreward) side of breakwaters. Additionally, this goal is accomplished by providing an anti-scour device including a plurality of sections.

Each section of the anti-scour device includes flexible, non-corrosive, marine-safe material, e.g., High Density Polyethelyne (HDPE) geogrid, for example, such as that commercially available from Tensar Earth Technologies Inc. of Morrow, Ga., or marine resistant gabbion, folded, sandwiched and/or constructed in such a manner as to create at least one cavity therein, i.e., similar in shape to a mattress. The material must be flexible enough to articulate to an uneven seabed and must have sufficient density so as not to be torn apart during storm events. The at least one cavity is filled with a non-buoyant material, e.g., stones or bricks, having sufficient weight such that the mattress does not become dislodged from the seabed during storm events. Alternatively, each section of the anti-scour device may include sub-sections made of a non-buoyant material, e.g., concrete blocks, coupled together using non-corrosive material, to create a section that articulates to the seabed and which will not become dislodged during storm events.

The HDPE geogrid material may include at least upper and lower ribs. Preferably, the ribs are horizontally oriented between vertically-oriented junctions, so as to form horizontally-elongated openings. The HDPE geogrid material is uniformly very strong, i.e., there is a continuity of high tensile strength (e.g., 130,000 lbs/ft). As a result, damage to the HDPE geogrid material during severe storms is largely avoided. Moreover, because the HDPE geogrid material is composed of plastic, it is generally not subject to biological or chemical breakdown. Consequently, the HDPE geogrid material is very long-lasting and requires relatively little maintenance.

When the mattress sections are positioned in side-by-side relation, running parallel to the shoreline, adjacent sections may be coupled together using, for example, a mechanical connection, such as a Bodkin joint through loops of the HDPE geogrid material.

Each mattress section is positioned over and rests on top of a material such as filter fabric which prevents scouring of sand from the seabed, e.g., between the stones or bricks, between the concrete blocks, between the mattress sections and/or between the mattress sections and the breakwater. Preferably, the filter fabric should have at least a slightly larger surface area than (but can be approximately equal to) that of a mattress section, and optimally should extend at least the width of a plurality of mattresses.

The length of each mattress is preferably approximately equal to the depth of the breakwater submergence, i.e., from storm-elevated mean sea level to the seabed. For example, if the normal depth from the seabed to mean sea level is 10 feet and a "one-hundred year event" storm causes the mean sea level to rise 6 feet, then the distance from the seabed to the storm-elevated mean sea level is 16 feet.

Each mattress section is positioned underwater on the beachward (shoreward) side of a breakwater running lengthwise toward the shore, and widthwise, parallel to the beachward (shoreward) side of the breakwater. The mattress may be tucked under the beachward (shoreward) bottom edge of the breakwater with the weight of the breakwater preventing the horizontal displacement of the mattress. Alternatively, the mattress may be coupled to the beachward (shoreward) bottom edge of the breakwater through, for example, a mechanical connection such as a Bodkin joint through loops of HDPE geogrid material. For this type of coupling, the breakwater must be constructed with the HDPE geogrid material embedded into its beachward (shoreward) bottom edge or retrofitted in this manner. Alternatively, the sections made from concrete blocks may be coupled to the breakwater as described above.

Thus, in a preferred embodiment of the present invention, each mattress will extend beachward (shoreward) from the breakwater a distance approximately equal to the depth of the breakwater at the seabed with respect to a storm-elevated mean sea level (e.g., the mean sea level during a "one-hundred year event" storm).

Terms such as "seabed" and the like are used in this specification. These terms are chosen to aid disclosure, rather than limit the invention, and use of such terms is not intended to limit the use of the present invention to, e.g., ocean beaches, salt water beaches, etc. Such terms are used herein to generically describe all bodies of water having beaches or the like where the present invention can be used.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

FIG. 1 shows a cross section of an anti-scour device positioned in relation to a breakwater, in a first embodiment of a device according to the present invention.

FIG. 2 shows a coupling between an anti-scour device and a breakwater, in a second embodiment of the device according to the present invention.

FIG. 3 shows a detailed diagram of the Bodkin formation shown in FIG. 2.

FIG. 4 shows a side view of a device for installing an anti-scour device, according to the present invention.

FIG. 5 shows a top view of the device for installing an anti-scour device, according to the present invention.

DETAILED DESCRIPTION

Referring to FIG. 1, there is shown a cross-section of an anti-scour device 1. The anti-scour device 1 has a plurality of sections that are coupled together. Each section of the anti-scour device 1 is made of a flexible, non-corrosive, marine-safe material such as, for example, HDPE geogrid or marine resistant gabbion, which is folded, sandwiched and/or constructed in such a manner as to create at least one cavity 3 therein, preferably, in the shape of a mattress 4, for example, having a rectangle shape, but which may instead be any shape desired. The anti-scour device 1 is placed on the seabed 5 adjacent to the beachward (shoreward) side 13 of the breakwater 7. The anti-scour device 1 extends beachward (shoreward) and has a length l (measured in the beachward (shoreward) direction) preferably equal to the distance from the seabed at the base of the breakwater 7 to the storm-elevated mean sea level 9. The anti-scour device 1 has a thickness h (measured from the seabed 5 upward) preferably of at least 8 inches. Within the at least one cavity 3 of the anti-scour device 1 is placed non-buoyant material 11 such as, for example, stones or bricks or any other material having sufficient weight such that the anti-scour device does not become dislodged vertically from the seabed 5 during storm events. The anti-scour device 1 has a width w which is preferably approximately equal to the width of a section of breakwater 7 (running approximately parallel to the shoreline), for example, the anti-scour device 1 may be 10 feet wide, e.g., the typical width of a section of breakwater. However, the anti-scour device 1 may instead be any width desired, such as, for example, 4½ feet wide, e.g., the width of a commercially-available HDPE geogrid material. The anti-scour device 1 must be flexible enough to articulate to an uneven seabed.

Alternatively, each section of the anti-scour device 1 may be made of subsections of non-buoyant material, for example, concrete blocks, coupled together using non-corrosive material, to create a section that articulates to the seabed and that will not become dislodged vertically from the seabed during storm events.

Each section of the anti-scour device 1 may include a section of filter material 15, which is preferably of a larger surface area (l×w) than a corresponding section of the mattress 4, and which is positioned between the mattress 4 and the seabed 5. The filter material 15 prevents sand from being scoured from the seabed 5, for example, from between the stones or bricks, from between the concrete blocks, from between the mattress sections 4 and/or from between the mattress sections 4 and the breakwater 7.

One edge 19 of each section of the anti-scour device 1 is positioned under the beachward (shoreward) bottom edge 17 of the breakwater 7, to secure it and prevent horizontal movement of the anti-scour device 1, i.e., movement toward or parallel to the shoreline (the breakwater 7 prevents movement away from shore).

Referring now to FIG. 2, there is shown a coupling between the anti-scour device 1 and a breakwater 7. As an alternative to positioning the anti-scour device 1 under the beachward (shoreward) bottom edge 17 of the breakwater 7, which may in certain instances be relatively impractical due to the location or timing of the installation, the anti-scour device 1 may be coupled to the breakwater 7 as shown in FIG. 2. In this embodiment, each section of the breakwater 7 is either constructed or retrofit with a piece of flexible, non-corrosive, marine-safe material such as, for example, HDPE geogrid material 19 embedded or anchored in its beachward (shoreward) bottom edge 17 (extending the entire width of the breakwater 7), such that a portion of the piece of HDPE geogrid material 19 extends beachward (shoreward) a certain distance, for example, one foot, beyond the edge of the breakwater 7.

Extending also from the anti-scour device 1 is a piece of flexible, non-corrosive, marine-safe material such as, for example, HDPE geogrid material 21. This piece of HDPE geogrid material 21 extends a certain distance, for example, one foot, beyond the edge of the mattress 4, in the seaward direction toward the breakwater 7. The two pieces of HDPE geogrid material 19 and 21 are then coupled using a mechanical connection such as, for example, a Bodkin formation 23.

A detailed diagram of the Bodkin formation 23 is shown in FIG. 3. To make the Bodkin formation 23, the two pieces of HDPE geogrid material 19, 21 must be interposed in an alternating configuration 25. A Bodkin rod 27 is then passed through the chamber (opening) 29 formed by the two pieces of HDPE geogrid material, thereby securing the anti-scour device 1 to the breakwater 7.

Referring now to FIGS. 4 and 5, the anti-scour device 1 may be installed using a special crane having a rectangular steel frame 40 that is large enough to set three breakwater sections 7 and the corresponding anti-scour device sections 1. The rectangular steel frame 40 is connected to the crane by a 4-way cable 41 and a main cable 43. The rectangular steel frame 40 may be fitted with a filter cloth 15, which is connected to the steel frame 40 using rubber tie downs 42 that allow the filter cloth 15 to be stretched on the steel frame 40 prior to placement on the sea bed 5.

The steel frame 40 has a steel center beam 44, for lifting with a crane. The center beam 44 is also used to attach one end 46 of the anti-scour device 1. The other end 48 of the anti-scour device 1 is attached to one of the outside edges 50 of the steel frame 40. When the steel frame 40 is ready to be set on the sea bed 5, it contains the complete filter cloth 15 and mattress 4. The assembled steel frame 40 is lifted from a barge with a crane and lowered to the sea bed 5. Divers, for example, then disconnect the rubber tie downs 42 and anti-scour device attachment. The steel frame 40 is then lifted back onto the barge and the completed anti-scour device is ready to be coupled to breakwater modules 7, if installed separately.

What is claimed is:

1. A device arranged underwater on a seabed, comprising:
   a plurality of sections of breakwater arranged on the seabed;
   a plurality of flexible sections of material arranged on the seabed, each of the sections having at least one cavity therein, each of the cavities containing non-buoyant material having sufficient weight to prevent a vertical displacement of the section during a storm event, each of the sections of material being coupled to a beachward side of one of the sections of breakwater.

2. The device according to claim 1, further comprising means for coupling each of the sections of material to at least one adjacently-disposed section of material.

3. The device according to claim 1, further comprising means for coupling each of the sections of breakwater to at least one adjacently-disposed section of breakwater.

4. The device according to claim 1, wherein each section of material includes flexible, non-corrosive, marine-safe material.

5. The device according to claim 1, where in at least one of the sections of material is rectangular-shaped.

6. The device according to claim 1, wherein at least one of the sections of material is mattress-shaped.

7. The device according to claim 1, wherein at least one of the sections of material includes HDPE geogrid material.

8. The device according to claim 1, wherein at least one of the sections of material includes marine-safe gabbion.

9. The device according to claim 1, wherein the non-buoyant material includes stones.

10. The device according to claim 1, wherein the non-buoyant material includes bricks.

11. The device according to claim 1, further comprising a Bodkin joint for coupling each of the sections of material to the beachward side of one of the sections of breakwater.

12. The device according to claim 1, wherein a length of at least one of the sections of material is approximately equal to a distance from the seabed where a breakwater adjacent to the section of material is arranged to a storm-elevated mean sea level at the breakwater.

13. The device according to claim 1, wherein a height of at least one of the sections of material is at least 8 inches.

14. The device according to claim 1, wherein a portion of at least one of the sections of material is arranged under a beachward side of a corresponding section of breakwater to prevent a displacement of the section of material.

15. The device according to claim 1, further comprising a layer of filter material disposed between at least one of the sections of material and the seabed, to prevent scouring of sand from the seabed.

16. The device according to claim 15, wherein the filter material covers a first surface area of the seabed approximately equal to a second surface area of the seabed covered by at least one of the sections of material.

17. The device according to claim 15, wherein the filter material covers a first surface area of the seabed greater than a second surface area of the seabed covered by at least one of the sections of material.

18. A method for preventing scouring of sand from a seabed adjacent to a breakwater, comprising the steps of:
   providing a plurality of flexible sections of material on the seabed adjacent to the breakwater and extending shoreward therefrom, each of the sections having at least one cavity filled with non-buoyant material having sufficient weight to prevent a vertical displacement of the section during a storm event;
   coupling at least one of the sections to a beachward side of the breakwater; and
   coupling each of the sections to at least one adjacently-disposed section.

19. The method according to claim 18, further comprising the step of positioning filter material between the sections and the seabed.

20. The method according to claim 18, wherein the at least one cavity is formed by folding the flexible material.

21. The method according to claim 18, wherein the at least one cavity is formed by sandwiching a first piece and a second piece of the flexible material.

22. A method for preventing scouring of sand from a seabed adjacent to a breakwater, comprising the steps of:
   placing a plurality of cement blocks flexibly coupled to one another, of sufficient weight such that there can be approximately no vertical movement of the blocks due to a storm event, on the seabed adjacent to the breakwater and extending beachward therefrom; and
   coupling at least one of the cement blocks to a beachward side of the breakwater.

23. A method for installing an anti-scour device, comprising the steps of:
- connecting a first end of the anti-scour device to a center beam of a frame;
- connecting a second end of the anti-scour device to an outside edge of the frame;
- lifting the frame with a crane;
- setting the frame on a seabed adjacent to a breakwater;
- disconnecting the anti-scour device from the frame; and
- coupling the anti-scour device to the breakwater.

24. The method according to claim 23, further comprising the steps of connecting a layer of filter material to the frame and subsequently disconnecting the layer of filter material from the frame.

* * * * *